US012652430B2

(12) United States Patent
Chen et al.

(10) Patent No.: US 12,652,430 B2
(45) Date of Patent: Jun. 9, 2026

(54) VIDEO AND AUDIO SIGNAL PROCESSING CHIP, VIDEO AND AUDIO SIGNAL PROCESSING DEVICE INCLUDING THE SAME, AND VIDEO AND AUDIO SIGNAL PROCESSING METHOD

(71) Applicant: REALTEK SEMICONDUCTOR CORPORATION, Hsinchu (TW)

(72) Inventors: Rong Chen, Suzhou City (CN); Yue Cheng Zhao, Suzhou City (CN); Hao Zhou, Suzhou City (CN); Tao Xu, Suzhou City (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 615 days.

(21) Appl. No.: 18/045,738

(22) Filed: Oct. 11, 2022

(65) Prior Publication Data

US 2023/0115125 A1     Apr. 13, 2023

(30) Foreign Application Priority Data

Oct. 12, 2021     (CN) .......................... 202111188238.8

(51) Int. Cl.
*H04N 21/426*          (2011.01)
(52) U.S. Cl.
CPC ................................. *H04N 21/426* (2013.01)
(58) Field of Classification Search
CPC .................................................. H04N 21/426
See application file for complete search history.

(56) References Cited

U.S. PATENT DOCUMENTS

| 5,742,361 | A | * | 4/1998 | Nakase | ................... | E03D 11/18 |
| | | | | | | 348/E5.005 |
| 5,982,459 | A | * | 11/1999 | Fandrianto | ............. | H04N 7/142 |
| | | | | | | 348/E7.079 |
| 6,792,006 | B1 | * | 9/2004 | Kumaki | ............. | H04N 21/2368 |
| | | | | | | 370/537 |
| 8,811,470 | B2 | | 8/2014 | Kimura et al. | | |

(Continued)

FOREIGN PATENT DOCUMENTS

| CN | 101291422 A | 10/2008 |
| CN | 101626476 | 12/2010 |

(Continued)

OTHER PUBLICATIONS

First Office Action from TW corresponding application 111100106 dated Sep. 26, 2022.

(Continued)

*Primary Examiner* — Kyu Chae
(74) *Attorney, Agent, or Firm* — WPAT, P.C.; Anthony King

(57) ABSTRACT

The present disclosure provides a video and audio signal processing chip, a video and audio signal processing device including the same, and a video and audio signal processing method. The video and audio signal processing chip includes a signal detection module, a storing unit and a controller. The signal detection module is configured to detect and store video and audio signals. The controller is configured to: transfer the video and audio signals from the signal detection module to the storing unit; and transmit the video and audio signals stored in the storing unit to a host.

19 Claims, 5 Drawing Sheets

(56) References Cited

U.S. PATENT DOCUMENTS

2001/0054140 A1 * 12/2001 Oberman ............ G06F 9/30036
                                          712/E9.02
2007/0286275 A1 * 12/2007 Kimura ............... G06F 13/4027
                                          386/E5.07
2008/0018651 A1     1/2008 Huang et al.
2008/0291074 A1 * 11/2008 Tzeng ............. H04N 21/43637
                                          398/140
2009/0122714 A1 *  5/2009 Kato ................... H04N 21/434
                                          370/252
2013/0141308 A1 *  6/2013 Huang ............ H04N 21/41407
                                          345/2.1
2015/0169276 A1 *  6/2015 Ma ........................ G06F 3/1423
                                          710/63
2021/0081344 A1     3/2021 Chang et al.

FOREIGN PATENT DOCUMENTS

TW          200807292          2/2008
TW          202114403 A        4/2021

OTHER PUBLICATIONS

English summary of the first office action from TW corresponding application 111100106 dated Sep. 26, 2022.
English translation of CN 101291422A.
US20210081344A1 corresponds to TW202114403A.
Brief Translation of Office Action corresponding to Taiwanese application No. TW 111100106 issued on Feb. 20, 2023.

* cited by examiner

Detecting a video and audio signal

S401

Storing the video and audio signal to a register

S402

Packaging the video and audio signal as a packet data

S403

Storing the packet data to a storing unit

S404

Transmitting the video and audio signal stored in the storing unit to a host

S405

Writing a boundary byte between each of commands

S406

VIDEO AND AUDIO SIGNAL PROCESSING CHIP, VIDEO AND AUDIO SIGNAL PROCESSING DEVICE INCLUDING THE SAME, AND VIDEO AND AUDIO SIGNAL PROCESSING METHOD

CROSS REFERENCE TO RELATED APPLICATIONS

This application claims priority of China application No. 202111188238.8 filed on Oct. 12, 2021, which is incorporated by reference in its entirety.

BACKGROUND

Field of the Invention

The present invention relates generally to a technique of analyzing video and audio signal, in particular, to a video and audio signal processing chip, a video and audio signal processing device including the same, and a video and audio signal processing method.

Description of Related Art

Most of the existing video and audio signal (e.g., DisplayPort video signal) analysis devices use field programmable gate array (FPGA) for signal processing and use an additional double data rate (DDR) memory (e.g., DDR SDRAM) for associated data storage. In addition, it is usually necessary to use special cables to maintain the high transmission speed of the main data of the video signals, thereby resulting in an issue of high cost.

BRIEF SUMMARY OF THE INVENTION

Some embodiments of the present invention provide a video and audio signal processing chip. The video and audio signal processing chip includes a signal detection module, a storing unit and a controller. The signal detection module, the storing unit and the controller are electrically connected. The signal detection module is configured to detect and store video and audio signals. The controller is configured to: transfer the video and audio signals from the signal detection module to the storing unit; and transmit the video and audio signals stored in the storing unit to a host.

Some embodiments of the present invention provide a video and audio processing device. The video and audio processing device includes the above video and audio processing chip, a video and audio signal input interface, a video and audio signal output interface and a packet data output interface. The video and audio processing chip, the video and audio signal input interface, the video and audio signal output interface and the packet data output interface are electrically connected. The video and audio signal input interface is configured to receive a video and audio signal from a signal source. The video and audio signal output interface is electrically connected to the video and audio signal input interface and the video and audio signal processing chip, and is configured to transmit the video and audio signal to a signal destination. The packet data output interface is electrically connected to the video and audio signal processing chip and configured to transmit the packet data to a host.

Some embodiments of the present invention provide a video and audio signal processing method. The video and audio signal processing method includes: detecting a video and audio signal, wherein the video and audio signal is transmitted from a signal source to a signal destination; storing the video and audio signal to a register; transferring the video and audio signal from the register to a storing unit; and transmitting the video and audio signal stored in the storing unit to a host.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the disclosure.

Figure 1:
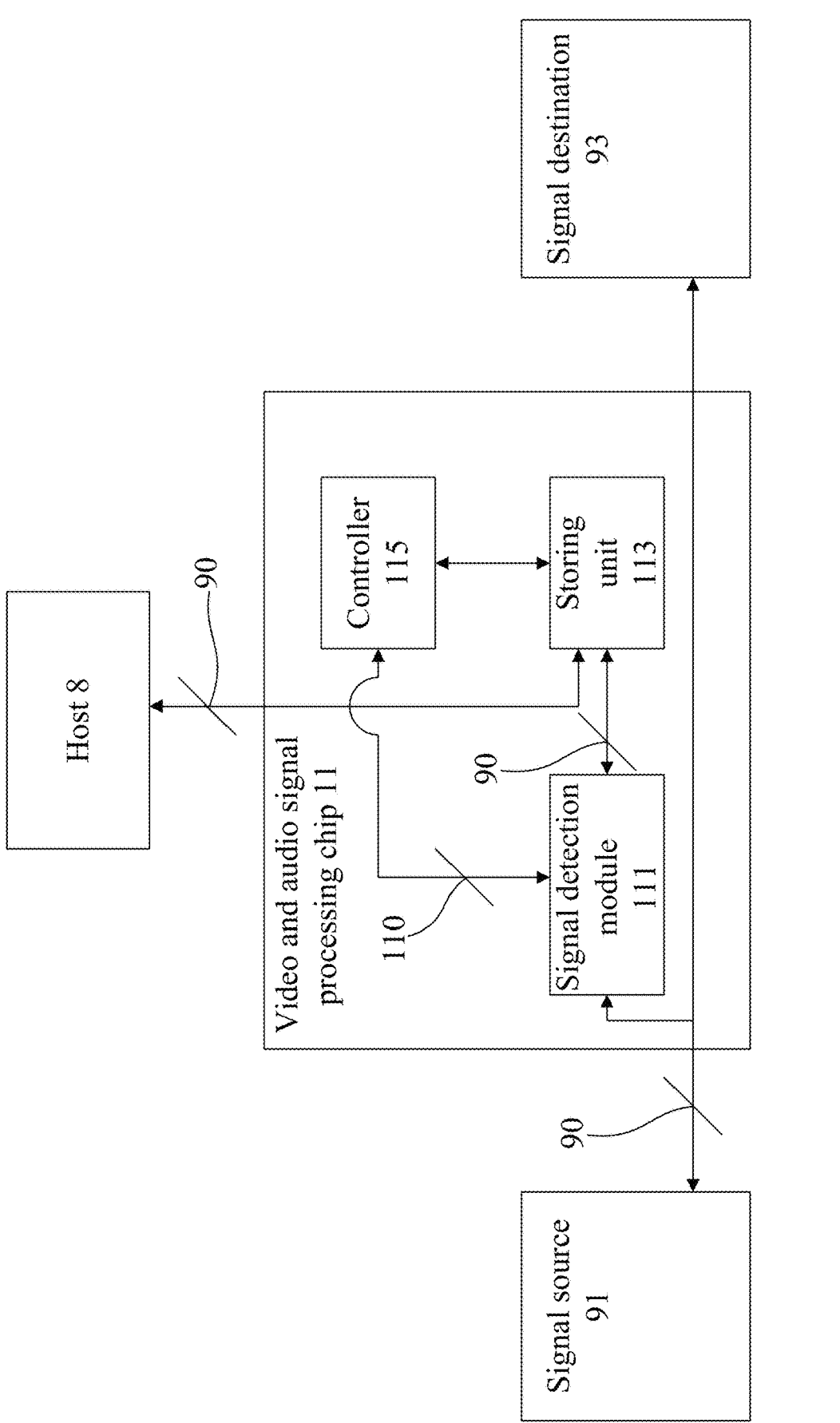
FIG. 1 is a block diagram illustrating a video and audio signal processing chip according to some embodiments of the present disclosure.

Reference is made to FIG. 1, which is a block diagram illustrating a video and audio signal processing chip 11 according to one embodiment of the present disclosure. The video and audio signal processing chip 11 includes a signal detection module 111, a storing unit 113 and a controller 115. The signal detection module 111, the storing unit 113 and the controller 115 are electrically connected to each other to transmit data and signal; detailed processing operations will be further discussed below.

In the present embodiment, the video and audio signal processing chip 11 is connected to a signal source 91 and a signal destination 93. When the signal source 91 transmits a video and audio signal 90 to the signal destination 93, the signal detection module 111 detects and stores the video and audio signal 90.

Subsequently, the signal detection module 111 sends an interrupt request 110 to the controller 115. The controller 115 stores the video and audio signal 90 to the storing unit 113 according to the interrupt request 110 and transmits the same to a host 8, so that the host 8 may parse the video and audio signal 90 using an application program and provide the parsed result to a user.

Figure 2A:
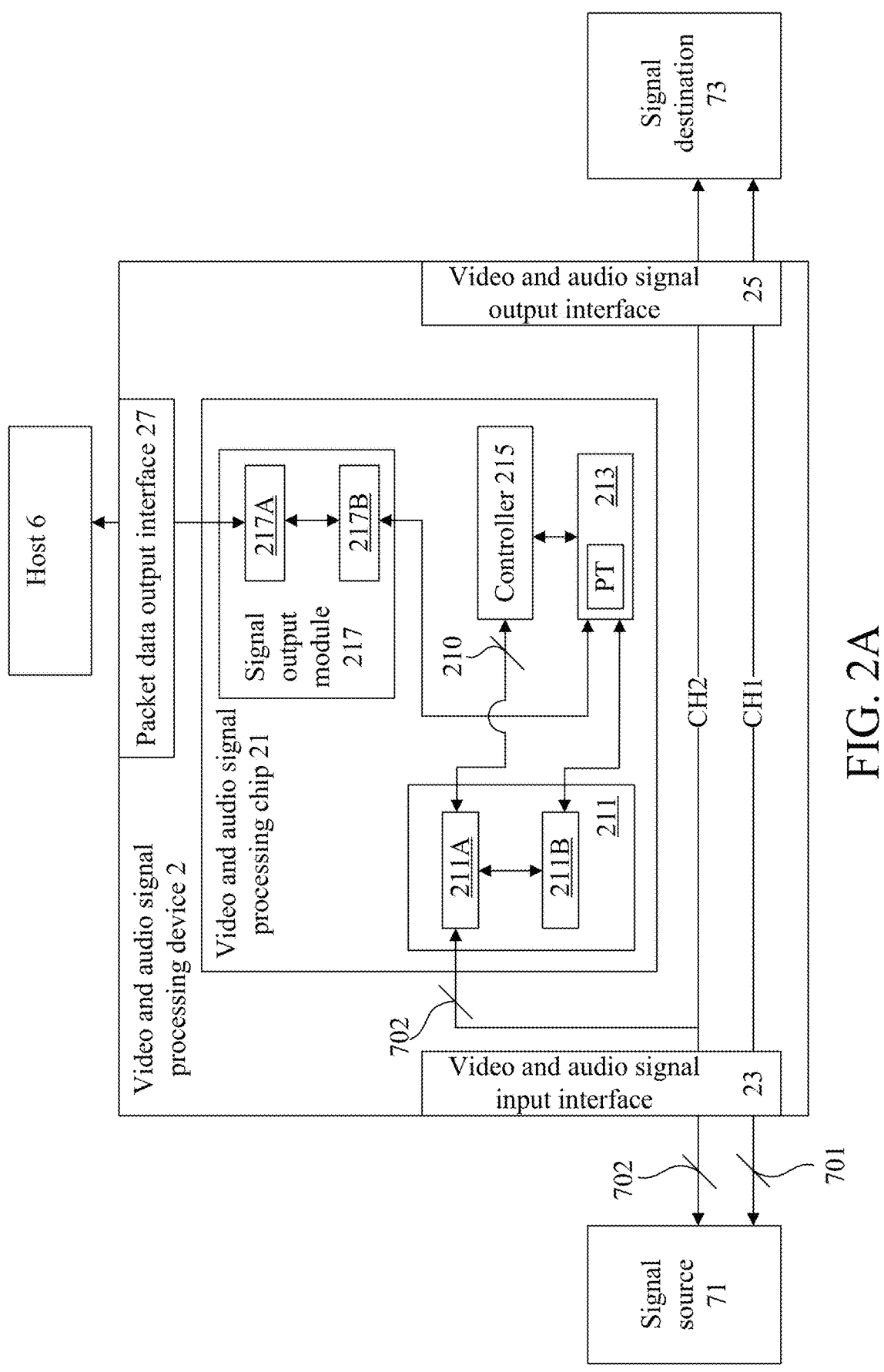
FIG. 2A is a block diagram illustrating a video and audio signal processing device according to some embodiments of the present disclosure.

Reference is made to FIG. 2A, which is a block diagram illustrating a video and audio signal processing device 2 according to another embodiment of the present disclosure. The video and audio signal processing device 2 includes a video and audio signal processing chip 21, a video and audio signal input interface 23, a video and audio signal output interface 25, and a packet data output interface 27. The video and audio signal processing chip 21 is electrically connected to the video and audio signal input interface 23, the video and audio signal output interface 25 and the packet data output interface 27. In some embodiment, the video and audio signal input interface 23 and the video and audio signal output interface 25 include a DisplayPort interface or a USB Type C interface, but the present disclosure is not limited thereto.

The video and audio signal processing chip 21 includes a signal detection module 211, a storing unit 213 (e.g., a memory having a size of approximately 7K bytes), a controller 215, and a signal output module 217. The signal detection module 211, the storing unit 213, the controller 215 and the signal output module 217 are electrically connected to one another. The signal detection module 211 includes a signal receiver 211A and a register 211B (e.g., a register having a size of approximately 128 bytes).

The signal output module 217 includes a receiver 217A and a storing unit 217B. The register 211B and the storing unit 213 store data in a manner of first-in first-out (FIFO) configuration. Data and signals are transmitted among components via electrical connection. Associated processing operations are discussed further below.

Specifically, the video and audio signal processing device 2 is connected to a signal source 71 and a signal destination 73 via the video and audio signal input interface 23 and the video and audio signal output interface 25, respectively. Two transmission channels CH1, CH2 are between the video and audio signal input interface 23 and the video and audio signal output interface 25. When the signal source 71 transmits a video and audio signal to a signal destination 73, the transmission channel CH1 is configured to transmit a video and audio data 701 of the video and audio signal and the transmission channel CH2 is configured to transmit a control signal 702 of the video and audio signal.

Next, the signal receiver 211A of the signal detects module 211 detects the control signal 702, and stores the control signal 702 in the register 211B. At the same time, the signal receiver 211A sends an interrupt request 210 to the controller 215. The controller 215 retrieves the control signal 702 from the register 211B according to the interrupt request 210. Subsequently, the controller 215 packages the control signal 702 as a packet data PT and stores the packet data PT to the storing unit 213.

Figure 2B:
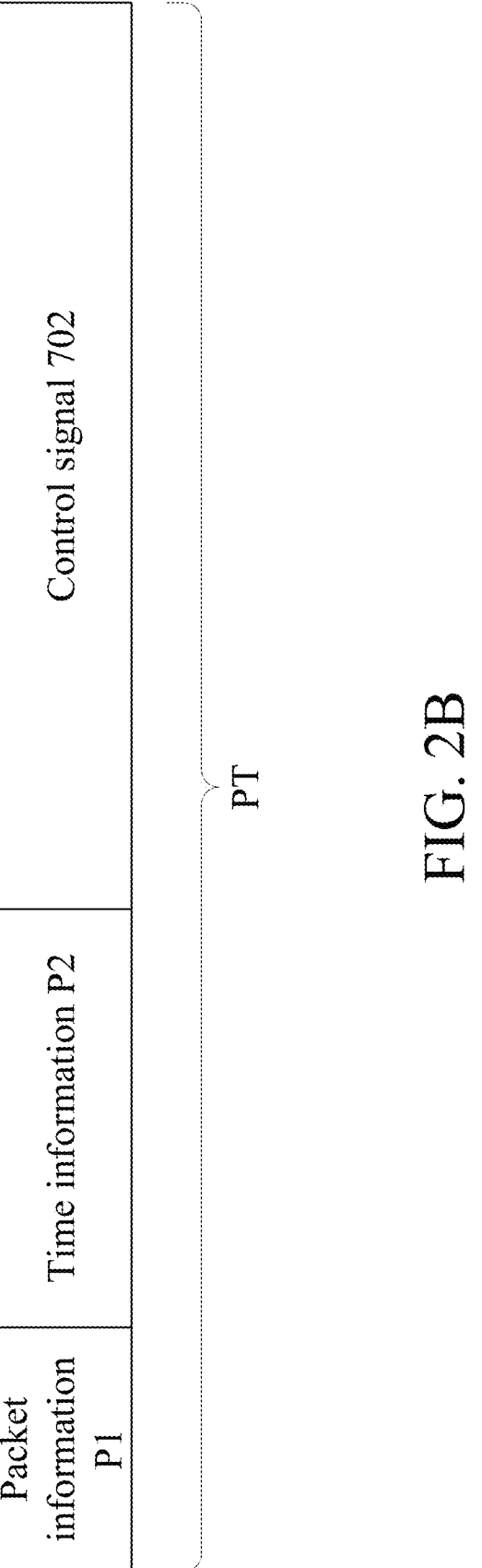
FIG. 2B is a schematic diagram illustrating the packet data according to some embodiments of the present disclosure.

Reference is also made to FIG. 2B, which is a schematic diagram illustrating the packet data PT according to some embodiments of the present disclosure. In particular, the packet data PT includes a packet information P1, a time information P2 and the control signal 702. The time information P2 records a signal occurrence time or a signal capture time of the control signal 702. The packet information P1 records a data length of the control signal 702 and a packet state of the packet data PT.

In some embodiments, the control signal 702 of the video and audio signal includes an auxiliary channel command associated with the DisplayPort protocol or a hot plug detect (HPD) signal associated with the DisplayPort protocol. X bits of the packet information P1 are configured to record the data length of the control signal 702, and Y bits of the packet information P1 are configured to record the packet state of the packet data. The length of the packet information P1 is X+Y bits.

In another embodiment, the packet information P1 may use 3 bits to record the packet state of the packet data. When the 3 bits recording the packet state are '000', it may mean that the time information P2 and the packet data PT of the control signal 702 are stored to the storing unit 213 successfully. When the 3 bits recording the packet state are '001', it may mean that the information recorded in the packet data PT includes the HPD signal or the interrupt request. When the 3 bits recording the packet state are '100', it may mean that one or more control signals were not stored due to insufficient space of the storing unit 213; in other words, an overflow was occurred in the storing unit 213; however, the current packet data PT may be recorded in the storing unit 213 successfully.

When the 3 bits recording the packet state are '101', it may mean that the data of the current control signal 702 are not recorded successfully due to insufficient space of the storing unit 213, and only the time information P2 are recorded; in other words, the recording storing unit 213 is now in the overflow state. When the 3 bits recording the packet state are '110', it may mean that one or more control signals were not stored due to insufficient space of the storing unit 213 (i.e., an overflow state was occurred in the storing unit 213), the data of the current control signal 702 are not recorded successfully, and only the time information P2 can be recorded (i.e., the recording storing unit 213 is now in the overflow state).

When the 3 bits recording the packet state are '101', it may mean that the data of the current control signal 702 are not recorded successfully due to insufficient space of the storing unit 215, and only the time information P2 are recorded; in other words, the recording storing unit 215 is now in the overflow state. When the 3 bits recording the packet state are '110', it may mean that one or more control signals were not stored due to insufficient space of the storing unit 215 (i.e., an overflow state was occurred in the storing unit 215), the data of the current control signal 702 are not recorded successfully, and only the time information P2 can be recorded (i.e., the recording storing unit 215 is now in the overflow state).

In some embodiments, the controller 215 transmits, via the signal output module 217, the packet data PT to a host 6 through the packet data output interface 27. Specifically, the controller 215 transfers the packet data PT stored in the storing unit 213 to the storing unit 217B of the signal output module 217. Subsequently, the transceiver 217A of the signal output module 217 transmits the packet data PT stored in the storing unit 217B to the host 6 through the packet data output interface 27, so that the host 6 parses the control signal 702 using an application program and provides the parsed result to the user.

For example, when there is no data in the storing unit 213, the value of the first byte of the corresponding USB data packet is 0, and the values of all the remaining portion of the actual data are filled with 0. Subsequently, the USB data packet is transmitted to the host 6. When the data stored and not yet transmitted in the storing unit 213 does not exceed 31 bytes, the value of the first byte of the corresponding USB data packet records the length of the actual data in the current storing unit 213, and the value of the part of the actual data that is less than 31 bytes is filled with 0, and then the USB data packet is transmitted to the host 6. When the data stored and not yet transmitted in the storing unit 213 exceeds 31 bytes, the value of the first byte of the corresponding USB data packet is 0x1F, and the actual data includes the data of 31 bytes read from the storing unit 213, and then the USB data packet is transmitted to the host 6.

For example, when there is no data in the storing unit 215, the value of the first byte of the corresponding USB data packet is 0, and the values of all the remaining portion of the actual data are filled with 0. Subsequently, the USB data packet is transmitted to the host 6. When the data stored and not yet transmitted in the storing unit 215 does not exceed 31 bytes, the value of the first byte of the corresponding USB data packet records the length of the actual data in the current storing unit 215, and the value of the part of the actual data that is less than 31 bytes is filled with 0, and then the USB data packet is transmitted to the host 6. When the data stored and not yet transmitted in the storing unit 215 exceeds 31 bytes, the value of the first byte of the corresponding USB data packet is 0x1F, and the actual data includes the data of 31 bytes read from the storing unit 215, and then the USB data packet is transmitted to the host 6.

In some embodiments, when a plurality of commands occur between the signal source 71 and the signal destination 73 within a specific time interval, the signal receiver 211A stores the plurality of commands in the register 211B and writes a boundary byte between the commands to accurately identify the different commands when parsing the USB data packet. In this case, the boundary byte can be composed of multiple bytes.

Figure 3:
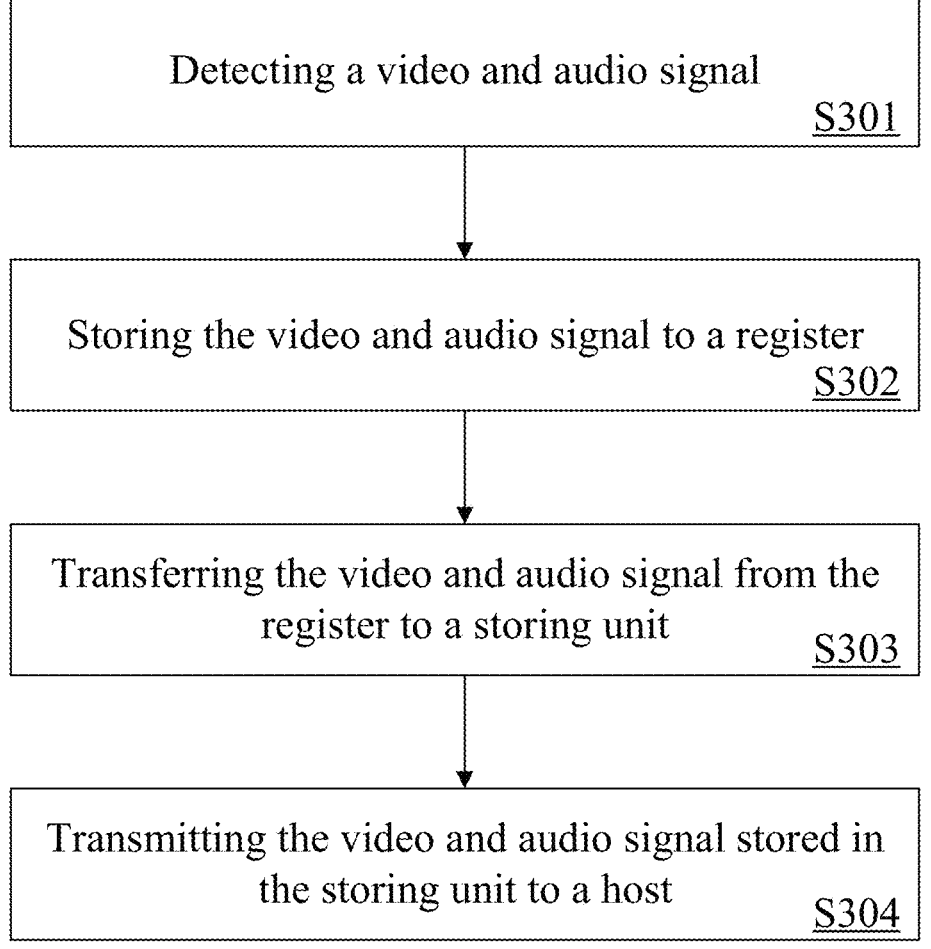
FIG. 3 is a flowchart of a video and audio signal processing method of according to some embodiments of the present disclosure.

Some embodiments of the present disclosure include a video and audio signal processing method, and the flow chart of which is shown in FIG. 3. The video and audio signal processing methods of these embodiments are implemented by a video and audio signal processing chip (such as the video and audio signal processing chip of the fore-going embodiments), and the details of the methods are as follows.

First, in Step S301, a video and audio signal in detected. The video and audio signal is transmitted from a signal source to a signal destination. Then in Step S302, the video and audio signal is stored to a register. Then in Step S303, the video and audio signal is transferred from the register to a storing unit. Then in Step S304, the video and audio signal stored in the storing unit is transmitted to a host, so that the host can use an application program to parse the video and audio signal and provide the parsed result to a user.

Figures 4A, 4B:
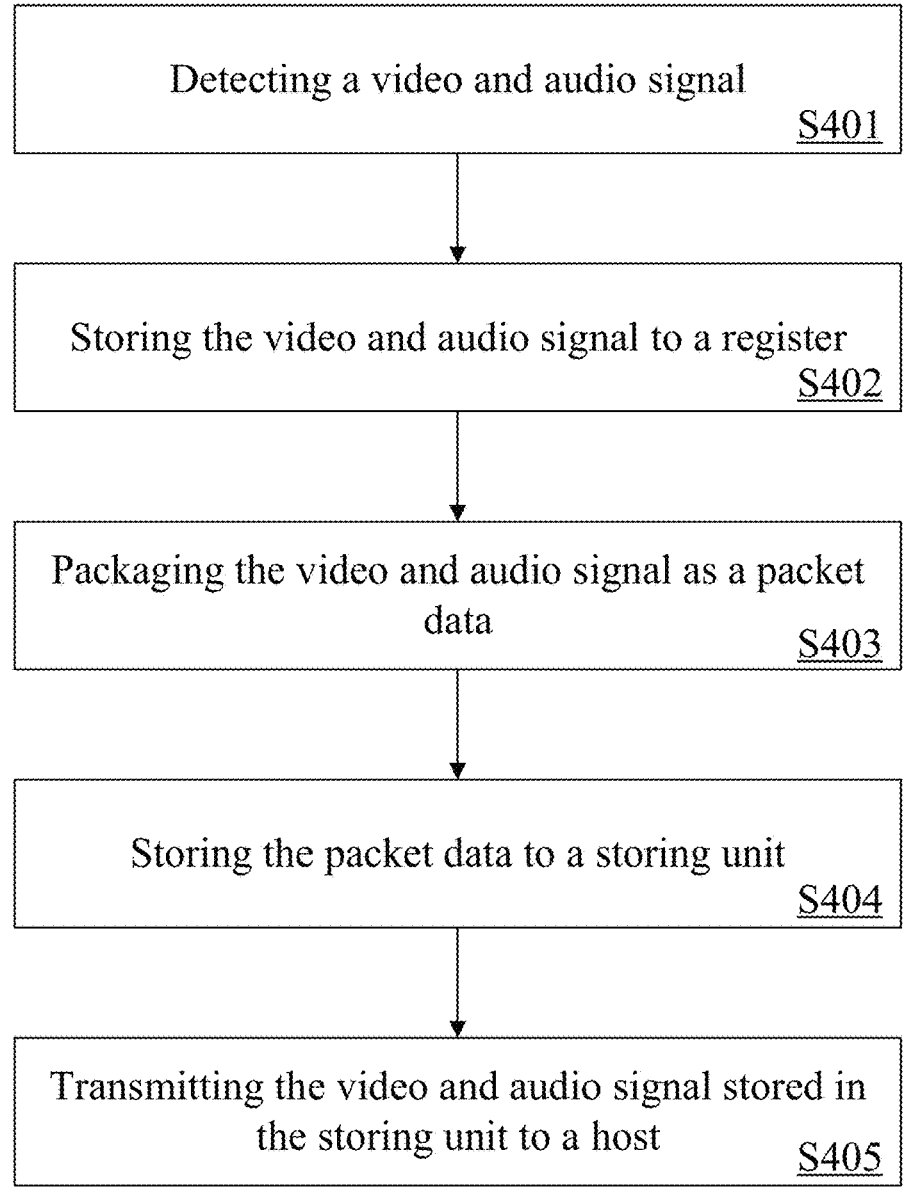
FIGS. 4A and 4B are flowcharts of a video and audio signal processing method of according to some embodiments of the present disclosure.

Some embodiments of the present disclosure include a video and audio signal processing method, and the flow chart of which is shown in FIG. 4A and FIG. 4B. The video and audio signal processing methods of these embodiments are implemented by a video and audio signal processing chip (such as the video and audio signal processing chip of the fore-going embodiments), and the details of the methods are as follows.

First, in Step S401, a video and audio signal is detected. In this case, the video and audio signal is transmitted from a signal source to a signal destination. Then in Step S402, the video and audio signal is stored to a register. Then in Step S403, the video and audio signal is packaged as a packet data. In this case, the packet data includes a packet information, a time information and a video and audio signal. The packet information records a data length of the video and audio signal and a packet state of the packet data. The video and audio signal includes an auxiliary channel command associated with the DisplayPort protocol or an HPD signal associated with the DisplayPort protocol.

Next, in Step S404, the packet data is store to the storing unit. Then in Step S405, the packet data stored in the storing unit is transmitted to a host, so that the host can use an application program to parse the video and audio signal and provide the parsed result to a user. In some embodiments, when the video and audio signal includes a plurality of commands, the video and audio signal processing method can execute Step S406 before executing Step S403 to selectively write a boundary byte between each command.

In summary, the video and audio signal processing chip, the video and audio signal processing device including the video and audio signal processing chip, and the video and audio signal processing method provided by the present disclosure provide an effective parsing operation of video and audio signal analysis by integrating the modules into a System on Chip (SoC), while significantly reducing the cost at the same time. It should be noted that in some embodiments, the controller of the aforementioned video and audio signal processing chip includes logic circuits that can perform calculations and commands, and the signal receiver includes high speed receiving circuits, but they are not used to limit the implementation of the hardware components of the present disclosure.

While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A video and audio signal processing chip, comprising:
a signal detection module, configured to:
detect a video and audio signal, wherein the video and audio signal is transmitted from a signal source to an external signal destination; and
store the video and audio signal;
a first storing unit, electrically connected to the signal detection module; and
a controller, electrically connected to the signal detection module and the first storing unit and configured to:
transfer the video and audio signal from the signal detection module to the first storing unit; and
transmit the video and audio signal stored in the first storing unit to an external host,
wherein the signal detection module further comprises:
a signal receiver, configured to detect the video and audio signal; and
a register, electrically connected to the signal receiver and configured to store the video and audio signal.

2. The video and audio signal processing chip of claim 1, wherein the signal receiver sends an interrupt request to the controller after detecting the video and audio signal, and the controller transfers the video and audio signal from the register to the first storing unit according to the interrupt request.

3. The video and audio signal processing chip of claim 1, wherein the video and audio signal comprises a plurality of commands, and the signal receiver is further configured to write a boundary byte between each of the commands.

4. The video and audio signal processing chip of claim 1, wherein transferring the video and audio signal from the signal detection module to the first storing unit further comprises:
retrieving the video and audio signal from the register;
packaging the video and audio signal as a packet data, wherein the packet data comprises the video and audio signal and a time information; and
storing the packet data to the first storing unit.

5. The video and audio signal processing chip of claim 4, wherein the packet data further comprises a packet information, the packet information records a data length of the video and audio signal and a packet state of the packet data.

6. The video and audio signal processing chip of claim 5, wherein the video and audio signal comprises an auxiliary channel command associated with a DisplayPort protocol or and a hot plug detect (HPD) signal associated with the DisplayPort protocol.

7. The video and audio signal processing chip of claim 6, wherein a first number of bits of the packet information is configured to record the data length of the video and audio signal, and a second number of bits of the packet information is configured to record the packet state of the packet data.

8. The video and audio signal processing chip of claim 4, further comprising:

a signal output module, electrically connected to the controller and the first storing unit;

wherein the controller is further configured to transmit the packet data stored in the first storing unit to the external host via the signal output module.

9. The video and audio signal processing chip of claim 8, wherein the signal output module further comprises:

a second storing unit, configured to store the packet data; and a transceiver, configured to transmit the packet data to the external host.

10. A video and audio signal processing device, comprising:

the video and audio signal processing chip of claim 4;

a video and audio signal input interface, electrically connected to the video and audio signal processing chip and configured to receive the video and audio signal from the signal source;

a video and audio signal output interface, electrically connected to the video and audio signal input interface and the video and audio signal processing chip, and configured to transmit the video and audio signal to the external signal destination; and a packet data output interface, electrically connected to the video and audio signal processing chip and configured to transmit the packet data to the external host.

11. The video and audio signal processing device of claim 10, wherein the video and audio signal input interface and the video and audio signal output interface respectively comprise a DisplayPort interface or a USB Type C interface.

12. The video and audio signal processing device of claim 10, wherein the packet data output interface comprises a USB interface.

13. The video and audio signal processing device of claim 10, wherein two transmission channels are between the video and audio signal input interface and the video and audio signal output interface, one transmission channel of the two transmission channels is configured to transmit a video and audio data of the video and audio signal, and the other transmission channel of the two transmission channels is configured to transmit a control signal of the video and audio signal.

14. The video and audio signal processing device of claim 13, wherein the control signal of the video and audio signal comprises an auxiliary channel command associated with a DisplayPort protocol or a hot plug detect (HPD) signal associated with the DisplayPort protocol.

15. A method for processing a video and audio signal, suitable for a video and audio signal processing chip comprising a signal detection module, a controller, and a storing unit, the method comprising:

detecting, by the signal detection module, the video and audio signal, wherein the video and audio signal is transmitted from a signal source to an external signal destination;

storing, by the signal detection module, the video and audio signal to a register of the signal detection module;

transferring, by the controller, the video and audio signal from the register to the storing unit; and transmitting, by the controller, the video and audio signal stored in the storing unit to an external host.

16. The method for processing the video and audio signal of claim 15, wherein the step of transferring the video and audio signal from the register to the storing unit further comprises:

packaging the video and audio signal as a packet data, wherein the packet data comprises the video and audio signal and a time information; and storing the packet data to the storing unit.

17. The method for processing the video and audio signal of claim 16, wherein the packet data further comprises a packet information, and the packet information records a data length of the video and audio signal and a packet state of the packet data.

18. The method for processing the video and audio signal of claim 15, wherein the video and audio signal comprises a plurality of commands, and the method for processing the video and audio signal further comprises:

writing a boundary byte between each of the commands.

19. The method for processing the video and audio signal of claim 15, wherein the video and audio signal comprises an auxiliary channel command associated with a DisplayPort protocol or a hot plug detect (HPD) signal associated with the DisplayPort protocol.

* * * * *